United States Patent [19]

Pendergraft et al.

[11] Patent Number: 4,844,720

[45] Date of Patent: Jul. 4, 1989

[54] PROCESS FOR REMOVAL OF HYDROGEN SULFIDE AND HYDROGEN POLYSULFIDE FROM LIQUID SULFUR

[75] Inventors: Paul T. Pendergraft, Tulsa, Okla.; Russell L. McGalliard, Chicago, Ill.

[73] Assignee: Amoco Corporation, Chicago, Ill.

[21] Appl. No.: 594,093

[22] Filed: Mar. 28, 1984

Related U.S. Application Data

[63] Continuation of Ser. No. 364,584, Apr. 2, 1982, abandoned, which is a continuation of Ser. No. 093,566, Nov. 13, 1979, abandoned, which is a continuation of Ser. No. 826,435, Aug. 22, 1977, abandoned.

[51] Int. Cl.$^4$ ............................................. B01D 19/00
[52] U.S. Cl. ..................................... 55/73; 423/578 R
[58] Field of Search .................. 55/26, 53, 62, 73, 159, 55/199; 423/573, 576, 578

[56] References Cited

U.S. PATENT DOCUMENTS

| | | | |
|---|---|---|---|
| 1,331,645 | 2/1920 | Hood | 423/578 |
| 2,092,625 | 9/1937 | Rich | 423/578 |
| 2,169,261 | 8/1939 | Lee et al. | 423/578 |
| 2,994,588 | 8/1961 | Eickmeyer | 423/574 |
| 3,447,903 | 6/1969 | Wiewiorowski | 423/578 |
| 3,807,141 | 4/1974 | Estys et al. | 55/159 |
| 3,864,460 | 2/1975 | Connell | 55/73 |
| 3,890,120 | 6/1975 | Guyot et al. | 55/73 X |
| 3,978,004 | 8/1976 | Daumas et al. | 423/576 X |
| 4,054,642 | 10/1977 | Daumas et al. | 423/576 X |

FOREIGN PATENT DOCUMENTS

| | | | |
|---|---|---|---|
| 964040 | 3/1975 | Canada | 55/73 |
| 350574 | 6/1931 | United Kingdom | 423/578 |
| 1067815 | 5/1967 | United Kingdom | 55/73 |

OTHER PUBLICATIONS

"The Removal of H$_2$S Dissolved in Liquid Sulphur", W. J. Rennie, Quarterly Bulletin, vol. IX, No. 4, Jan.–Mar. 1973, pp. 19–23.

"The Sulfur-Hydrogen Sulfide System", Wiewiorowski et al., The Journal of Physical Chemistry, vol. 70, No. 1, Jan. 1966, pp. 234–238.

"H$_2$S Removal from Liquid Sulphur", King, Energy Processing Canada, Mar.–Apr. 1974, pp. 40, 42.

Primary Examiner—Robert Spitzer

[57] ABSTRACT

An improved method for reducing the hydrogen sulfide and hydrogen polysulfide content of liquid sulfur, wherein, the liquid sulfur is brought into contact with a solid degradation catalyst consisting of alumina or a cobalt-molybdenum impregnated alumina at 250° F. to 320° F., preferably 270°–275° F., in the presence of a gaseous purge stream of air or oxygen enriched air. In addition to exhibiting a many fold increase in rate of reaction relative to the use of either the catalyst without a purge gas or the purge gas alone, the use of an oxygen containing purge gas (such as wet air) in combination with the catalyst (such as alumina) shows a significant improvement, when compared to the use of a dry nitrogen purge in combination with the catalyst under similar conditions, in the kinetics of both the conversion of the polysulfides to sulfide (rate constant of 0.611 for wet air vs. 0.409 for dry nitrogen at 300° F.) and the removal of hydrogen sulfide from liquid sulfur (rate constant of 0.877 in wet air vs. 0.62 for dry nitrogen at 300° F.).

8 Claims, 1 Drawing Sheet

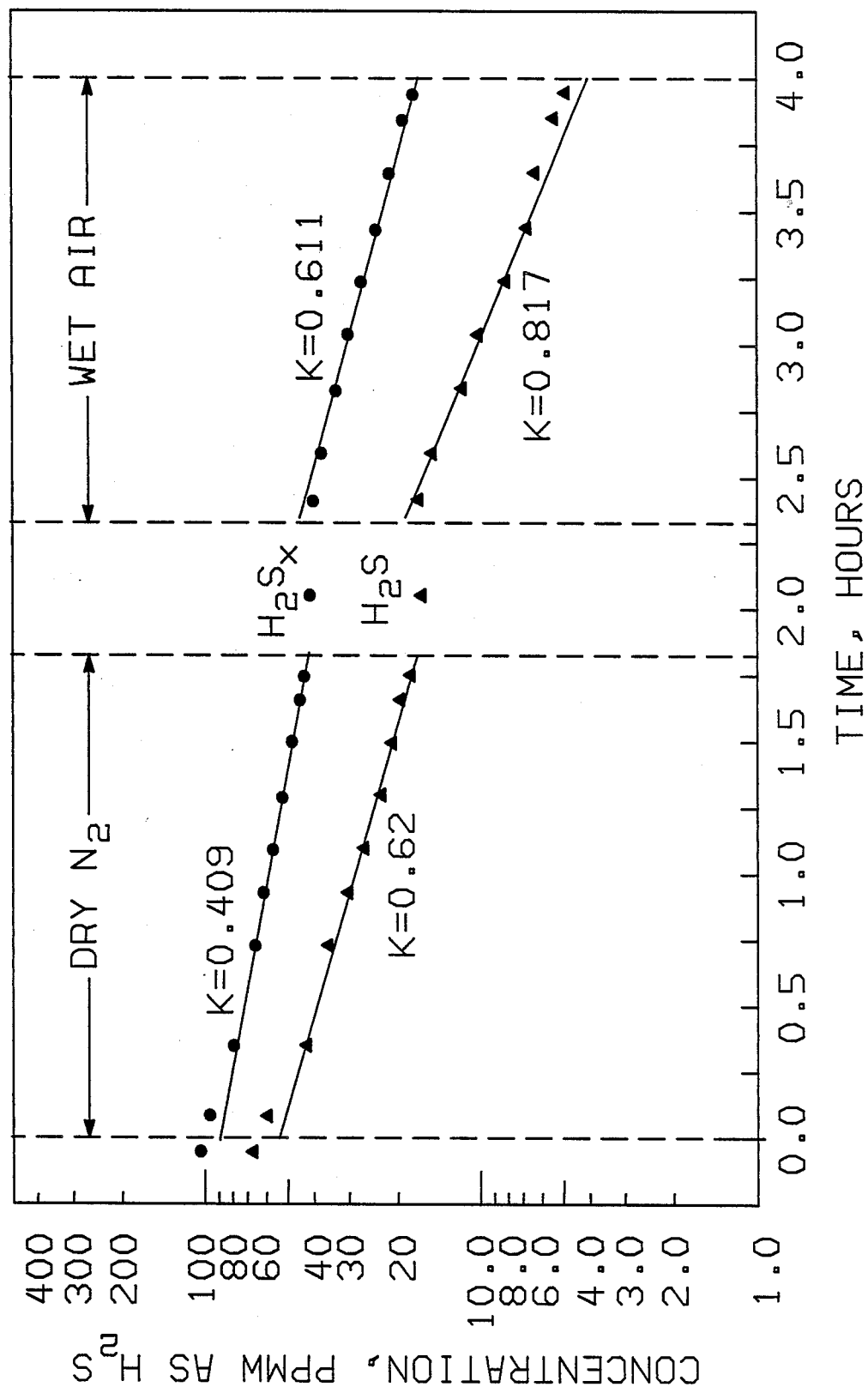

PROCESS FOR REMOVAL OF HYDROGEN SULFIDE AND HYDROGEN POLYSULFIDE FROM LIQUID SULFUR

This is a continuation of copending Application Ser. No. 364,584, field Apr. 2, 1982, now abandoned, which is a continuation of Application Ser. No. 093,566, filed Nov. 13, 1979, now abandoned, which is a continuation of Application Ser. No. 826,435, filed Aug. 22, 1977, now abandoned.

BACKGROUND OF THE INVENTION 1. Field of the Invention

The present invention relates to an improved process for catalytic conversion of hydrogen polysulfides to hydrogen sulfide in liquid sulfur and degasification of the liquid sulfur. More specifically, it is concerned with the removal of hydrogen polysulfides and hydrogen sulfide present in liquid sulfur produced by the Claus process. 2. Description of the Prior Art The toxicity and combustion hazards associated with gaseous hydrogen sulfide are well recognized and documented in literature. Further, the presence of hydrogen sulfide dissolved in sulfur (usually from 200 to 600 ppm by weight, particularly in sulfur produced in a Claus plant or sulfur from certain natural sources), and its associated slow release during subsequent handling and transportation are equally recognized commercially as serious health hazards.

Normally in a gas/liquid system the adsorption rate of the gas is lower at higher temperatures. Thus in principle, the hot liquid sulfure stream in contact with a gaseous phase containing hydrogen sulfide, as found in a Claus plant, should not represent a serious problem if the dissolution is the only adsorption process. However, the hydrogen sulfide is known to combine with the sulfur to form hydrogen polysulfides according to the following reaction:

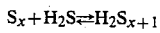

$$S_x + H_2S \rightleftharpoons H_2S_{x+1}$$

The formation of the polysulfides is favored at the high temperatures associated with the Claus plant. This is particularly true during the initial oxidation step in the furnace and boiler where the major portion of the sulfur is also produced. Unfortunately, the kinetics of the reverse reaction at lower temperatures characteristic of hydrogen sulfide removal are extremely slow. Thus, the polysulfides are inherently produced in the Claus process, and once formed are extremely slow in decomposing. Consequently, the apparent solubility of hydrogen sulfide in liquid sulfur is unexpectedly high due to the formation of polysulfides, and the subsequent release or removal of hydrogen sulfide is slow and difficult, frequently involving significant quantities of hydrogen sulfide being released days and even weeks after formation.

In response to this problem, commercial specifications have been suggested and adopted setting from 5 to 10 ppm by weight as the maximum desired $H_2S$ content for safe handling, storage and transportation of bulk quantities of liquid sulfur. To comply with these conditions, it has been recommended that any time the $H_2S$ content exceeds 15 ppm a $H_2S$ removal process should be employed.

Various techniques and methods have been proposed to accomplish the removal of $H_2S$ dissolved in sulfur. In British Pat. No. 1,067,815 a degasification process for removal of sulfur is proposed. The liquid sulfur containing hydrogen sulfide is atomized by forcing it through a jet or nozzle and then the resulting spray is directed against an obstacle, thus promoting the removal of the gaseous $H_2S$. It was further disclosed that the presence of ammonia (100 ppm) promoted the removal of $H_2S$. In the absence of the use of ammonia the $H_2S$ reduction is extremely slow, involving long time spans. The use of ammonia inherently results in a contaminated product.

Alternate methods for removal of $H_2S$ reminiscent of the Claus reaction have been proposed in U.S. Pat. No. 3,447,903 and Canadian Pat. No. 964,040. In U.S. Pat. No. 3,447,903 a catalytic process for producing elemental sulfur from $H_2S$ and $SO_2$ in liquid sulfur is disclosed. The catalyst involved is described generically as a basic nitrogen compound having a $K_B$ value (in water) greater than $10^{-10}$ and a solubility in molten sulfur of at least one part per million. This process, as taught, can be practiced for the purpose of controlling purity of liquid sulfur containing small concentrations of $H_2S$. Canadian Pat. No. 964,040 involves injecting liquid $SO_2$ and a nitrogen containing compound, which complexes with the $SO_2$ to form an adduct, into the molten sulfur for the expressed purpose of having the $SO_2$-nitrogen adduct react with the undesirable polysulfide dissolved in sulfur. Hence, it is known that certain nitrogen compounds in combination with $SO_2$ will catalytically reduce the $H_2S$ and $H_2S_x$ concentration found in liquid sulfur. Such processes against inherently involve soluble nitrogen containing species being present in the sulfur after degradation of the sulfide and polysulfides; i.e., the processes merely replace one contaminant for another contaminant.

In a more recent U.S. Pat. No. 3,807,141 an apparatus for reducing the $H_2S$ and $H_2S_x$ content of liquid sulfur without the addition of other contaminants such as ammonia or hydrogen sulfide reacting amines is disclosed. The apparatus involves a vertical liquid sulfur scrubbing tower, wherein, the liquid sulfur flows downward through the tower passing from one of a series of L-shaped baffle plates to another which tends to agitate and increase the surface area of the liquid sulfur allowing the dissolved $H_2S$ to escape. Although the sulfur recovered from the apparatus is free of nitrogen contaminants, the use of this device will involve either 1 to 9 days of continuous recycle or 1 to 8 days of storage prior to passing the sulfur over the series of baffles to insure breakdown of the polysulfides. Such time spans are impractical with respect to contemporary large scale commercial operations.

As summarized in an article entitled "$H_2S$ Removal from Liquid Sulphur" by F. W. King presented at the November, 1973 meeting of Canadian Natural Gas Processing Association and published in the Energy Processing/Canada, March–April, 1974, the liberation of $H_2S$ from liquid sulfur takes place in two ways, i.e., through a drop in temperature and through physical agitation. As implied in this article as well as the previously mentioned patents, the extremely slow conversion of hydrogen polysulfide back to hydrogen sulfide prior to degasification is the overall rate limiting step and the primary source of major concern. In addition to the known use of soluble amines and ammonia to catalyze the decomposition of $H_2S_x$, an article published by W. J. Rennie entitled "The Removal of $H_2S$ 'Dissolved' in Liquid Sulphur" in the Alberta Sulphur Research LTD. Quarterly Bulletin, v IX, No. 4, January–March, 1973, discloses on a laboratory scale ithe use of alumina, bauxite and Pbs supported on alumina as a solid catalyst for the conversion of $H_2S_x$ to $H_2S$ and suggests that they may be useful on a commercial plant scale.

SUMMARY OF THE INVENTION

In view of the aforementioned limitations and problems, I have discovered in a process for catalytic degradation of hydrogen polysulfide to hydrogen sulfide in liquid sulfur and removal of hydrogen sulfide from the liquid sulfur, the improvement which comprises contacting the liquid sulfur containing the hydrogen sulfide and hydrogen polysulfide with a solid degradation catalyst selected from the group consisting of alumina and alumina impregnated with a cobalt-molybdenum desulfurization catalyst at a temperature from 250° F. to 320° F. and simultaneously purging the liquid sulfur in contact with solid catalyst with a gas selected from the group consisting of air and oxygen enriched air, thus removing the hydrogen sulfide and hydrogen polysulfide from the liquid sulfur at a rate greater than previously achieved. My improved process is particularly unique in that not only is the rate of reaction for degradation of $H_2S_x$ to $H_2S$ and rate of removal of $H_2S$ from liquid sulfur far greater than that predicted from the sum of corresponding rates of the catalyst by itself and the degasification step by itself but also this combination significantly exceeds the rates corresponding to identical conditions with the catalyst and an inert gas such as nitrogen being employed. In fact, the use of undried air, instead of dry nitrogen, has been observed to result in an incremental increase of 49 percent in the rate constant for conversion of $H_2S_x$ to $H_2S$ and 31 percent in a rate constant descriptive of the removal of $H_sS$. Thus, the increased rates will correspond to more rapid removal of both $H_2S_x$ and $H_2S$.

The primary object of this invention is to provide a simple method for catalytically promoting the degradation of $H_2S_x$ and removal of $H_2S$ from liquid sulfur in a time frame consistent with contemporary commercial scale operations without introducing additional contaminants. Other objects of this invention will be apparent to one skilled in the art upon complete reading of the specification and claims.

BRIEF DESCRIPTION OF THE DRAWING

The drawing is a plot of the concentration of $H_2S_x$ (circles) and $H_2S$ (triangles) expressed in parts per million by weight as determined by infrared analysis as a function of reaction time at 300° F. and 18.5 cc/minute sweep gas in the presence of alumina during an experimental run involving the catalytic removal of $H_2S$ and $H_2S_x$ dissovled in liquid sulfur. As illustrated, approximately the first 1.75 hours involved a dry nitrogen sweep gas followed by 30 minutes of no gas flow. Then a final 1.75 hours of wet air purge was applied. During all three phases, all other parameters were held essentially identical. The apparent rate constants are presented on the appropriate portions of the curve.

DESCRIPTION OF THE PREFERRED EMBODIMENTS

As previously indicated, the specific improvement of the present invention involves the steps of contacting liquid sulfur contacting dissolved $H_2S$ and $H_2S_x$ with a solid catalyst while simultaneously sweeping the liquid sulfur with a purge gas containing oxygen. The novel aspect of this invention lies in the synergistic effect of the oxygen containing purge gas in combination with the solid catalyst upon the rates of conversion of $H_2S_x$ to $H_{2x}S$ and removal of the $H_2S$. Although the explicit mechanism involved is not fully understood, it has been empirically observed that both rate constants for the degradation step and degasification step are significantly altered when oxygen is present in the purge gas and both changes favor more rapid removal of $H_2S$.

Since the improved process of this invention is to be performed on liquid sulfur, the limits of the acceptable temperature range will be determined by two pragmatic considerations. The lower limit corresponds to the melting point of the highest melting form of elemental sulfur (approximately 250° F.). The upper limit corresponds to the known viscosity increase (approximately 320° F.) above which the molten sulfur is relatively unmanageable. As recognized in the art, lower temperature favor the decomposition of $H_2S_x$, yet too low a temperature increases the risk of the sulfur solidifying. Therefore, a temperature range of about 265° to 300° F. is preferred with the range 270° to 275° F. being particularly suitable for purposes of this invention.

The liquid sulfur to be processed by this invention comes from a variety of sources. Categorically, they involve sources of elemental sulfur contaminated with both $H_2S$ and $H_2S_x$. Usually, this involves sulfur which during or after contact with $H_2S$ has experienced temperatures in excess of 300° F., promoting the formulation of polysulfides. Various natural deposits are known to have both $H_2S$ and $H_2S_x$ present and many types of commercial plants produce sulfur of this nature. For purposes of this invention, the sulfur that is generated in the Claus type plant is of particular interest.

The concentration range of total sulfides ($H_2S$ plus $H_2S_x$) dissolved in the sulfur is frequently quoted in the literature as being from 200 to 700 ppm $H_2S$ by weight with even higher concentrations being known. The range of 200 ppm down to 5 ppm by weight and the kinetics of the decomposition reaction and degasification process in this range are of particular concern. Typically, a comtemporary commercial scale Claus plant will produce sulfides at the upper end of this range, but present toxicity and combustion safety limits favor the lower end of the range.

Since the present improvement involves a liquid sulfur phase, a solid catalyst and a sweep gas, the basic configuration of a plant utilizing this improvement can be any of the processes known in the art involving commingling of three phases. This would include, but is not limited to, processes such as cocurrent flow or countercurrent flow through a fixed bed of fluidized bed with or without vacuum assist and the like. This improvement is also consistent with the processes disclosed in the previously mentioned patents including the atomizing spray technique and the baffled scrubbing tower method. The preferred commercial embodiment involves a countercurrent flow arrangement, wherein, the molten sulfur flows down through a packed catalyst bed while the oxygen containing purge gas flows up through the bed. A cocurrent flow wherein both the liquid sulfur and the oxygen containing gas flow up through a packed bed of the catalyst can also be utilized.

The preferred solid catalysts to be used in this invention are alumina or more specifically activated (porous) aluminum oxide and alumina impregnated with a cobalt-molybdenum catalyst recognized in the petroleum refining art as desulfurization catalyst. The specific form, shape and size of the solid catalyst to be used depends on the particular process into which the improvement is to be incorporated. Thus, processes such as disclosed in the above mentioned patents may advantageously use alumina as a coating or structural component, while the preferred packed bed would employ an alumina particle of about 2 to 9 mesh and fluidized beds may employ a much finer powdered catalyst form. A 3 to 6 mesh size alumina particle is adequate for most commercial scale packed bed operations.

The purge gas employed in this improvement is essentially any oxygen contaiing gas including air, oxygen enriched air, and the like. Various other inert gases can be present including water vapor. Thus, if air is to be employed, no drying step is necessary.

In order to demonstrate the specific advantages associated with my improved process, a test using first dry nitrogen and then wet air as the stripping gas was made with all other conditions held constant. The experiment was performed in a test cell constructed from an aluminum block specifically designed for this purpose. The test cell contained internal provisions for saturation and stripping of the confined liquid sulfur with gases from an external source. It also contained internal provisions for continuous external infrared analysis of the composition of the liquid sulfur. Basically there were two cavities within the aluminum block each performing one of the aforementioned functions. One cylindrical cavity served as an infrared cell having a path length of 130 mm with zinc selenide windows at each end. A second vertical cylindrical cavity was equipped with a gas inlet sparge at the bottom and a gas outlet at the top. Positioned between the inlet and outlet was a basket capable of holding approximately one cubic inch of catalyst such as to simulate a packed column configuration. The test block was further designed for continuous circulation of the confined liquid sulfur. The liquid sulfur being lifted vertically in the catalyst containing cavity would flow from the top of this stripping chamber to one end of the infrared cell, through the infrared cell, out the other end and return to the bottom of the chamber containing the catalyst. The temperature of the aluminum block was controlled by pair of appropriately sized and monitored electrical heating elements. During the experimental run the entire aluminum block was placed directly in the infrared beam of a commerically available single beam IR analyser with a variable filter supplied by Wilks Scientific Corporation of south Norwalk, Conn. under the tradename of MIRAN I System. The block was positioned such that the IR beam passed directly through the first chamber via the zinc selenide windows permitting the measurement of light absorption as a function of frequency and reaction time.

The basic operation of the experimental equipment involves loading the catalyst basket with the selected catalyst and placing it in the vertical chamber between the gas inlet and gas outlet and filling the remaining portion of the internal chambers of the test block with liquid sulfur. The desired gas is pumped through the inlet at the bottom of the catalyst chamber. As it rises up through the catalyst bed and out the top, an internal circulation of the liquid sulfur through the IR cell chamber is induced. In this manner, the concentration of $H_2S$ and $H_2S_x$ impurities in the liquid sulfur can be monitored continuously and the effect of various catalysts and purge gases on the decomposition of $H_2S_x$ and removal of $H_2S$ can be studied.

In this specific case one cubic inch, approximately twelve grams, of 0.3 cm diameter spheres of an alumina catalyst, supplied commercially under the tradename Kaiser S-201 alumina, was placed in a catalyst basket made from 16 x 18 mesh aluminum screen and placed in the previously described catalyst chamber of the aluminum block. The remainder of the interior of the test block was filled with approximately 130 grams of liquid sulfur which was then intentionally contaminated to approximately 70 ppm $H_2S$ and 100 ppm $H_2S_x$ by bubbling a mixture of $N_2$ and $H_2S$ through the test cell for approximately 27 hours. A purge stream of dry nitrogen was then applied to the lower end of catalyst chamber at a controlled flow rate of 18.52 cc/min. during the first hour and forty minutes of the experiment. During this time the temperature was maintained at 300° F. and the IR analyzer repeatedly scanned and recorded the infrared spectrum from approximately $2.5\mu$ to $4.5\mu$. All adsorption measurements were made using the MIRAN I System with a slit width setting of 0.25 mm, gain selector at 10 X, and a time constant of 0.25 sec. At the end of 1 hour and 40 minutes the dry nitrogen flow was stopped and the test cell was maintained in a static condition for approximately 34 minutes while periodic IR scans were continued. A purge of wet air was commenced at a rate of 18.56 cc/min. and maintained for the next hour and forty minutes, again with repeated IR scans.

Quantitative interpretation of the IR spectrum was performed using the base line technique with adsorptions at $3.9\mu$ and $4.0\mu$ corresponding to $H_2S$ and $H_2S_x$ respectively, similar to work reported in T. K. Wiewiorowski and F. J. Touro, "The Sulfur-Hydrogen Sulfide System", The Journal of Phys. Chem. Vol. 70, No. 1, January, 1966, p. 234. Both the decomposition of $H_2S_x$ to $H_2S$ and the removal of the $H_2S$ from liquid sulfur were modeled by an overall 1st order rate law corresponding to $\ln(C/C_o) = kt$, where $C_o$ is the initial concentration of the species at time=o, C is the concentration at any time t>o and k is the rate constant.

The data from the above described test are presented in the drawing. It should be readily apparent form the respective portions of the curves and their associated rate constants that the use of wet air in combination with a solid alumnina catalyst involves more favorable kinetics of the decomposition of polysulfides as well as more rapid removal of hydrogen sulfide than the use of dry nitrogen with the same catalyst and conditions. The practice of this specific improvement on a commercial scale will possess the advantage of greater removal of $H_2S$ in a shorter period of time.

It should also be appreciated that in the absence of a catalyst the rate constants, measured in a manner analogous to the illustrated data, are significantly smaller indicative of much slower reaction rates. The incremental differences being observed here are associated with the choice of stripping gas being used in combination with the catalyst.

Further, the numerical values of the rate constants should not be interpreted as being unduly limiting for they are intended to establish relative effectiveness of the stripping gases and not absolute rates characteristic of a full scale commerical plant. Thus, for example, the rate of removal of $H_2S$ and $H_2S_x$ from liquid sulfur would be expected to vary according to which particular overall process (cocurrent, countercurrent, etc.) is selected and according to such variables as residence time, catalyst surface area and the like. However, it can be stated categorically that a solid catalyst greatly improves the hydrogen polysulfide decomposition rate and when used in combination with wet air or the like as a stripping gas, an additional significant incremental increase in the rates will result. Additionally, the rate of decomposition and degasification of this process as a whole tend to increase with a decrease in temperature and alumina with wet air seems to be more effective than the cobalt molybdenum with wet air.

We claim:

1. In a process for the catalytic degradation of hydrogen polysulfide ($H_2S_x$) to hydrogen sulfide ($H_2S$) followed by removal of the $H_2S$ comprising a step in which $H_2S_x$ is converted to $H_2S$ in liquid sulfur in the presence of a solid catalyst comprising alumina, the improvement which comprises:

contacting the liquid sulfur and the catalyst at a temperature in the range of about 250° F. to about 320° F. with a free oxygen containing gas and increasing the rate of the catalytic degradation of $H_2S_x$ to $H_2S$ and simultaneously purging the $H_2S$ from the liquid sulfur and increasing the rate of $H_2S$ removal therefrom wherein the rate of catalytic degradation of $H_2S_x$ to $H_2S$ and the rate of $H_2S$ removal are increased relative to corresponding rates for an inert gas in the presence of said catalyst.

2. A process of claim 1 involving a countercurrent flow wherein said liquid sulfur flows down through a packed bed of said catalyst and said purge gas flows up through said packed catalyst bed.

3. A process of claim 2 wherein said catalyst is alumina.

4. A process of claim 3 wherein said temperature is from about 270° F. to about 275° F.

5. A process of claim 1 involving a cocurrent flow wherein said liquid sulfur and said purge gas flow up through a packed bed of said catalyst.

6. A process of claim 5 wherein said catalyst is alumina.

7. A process of claim 6 wherein said temperature is from about 270° F. to about 275° F.

8. In a process for the catalytic degradation of hydrogen polysulfide ($H_2S_x$) to hydrogen sulfide ($H_2S$) followed by removal of the $H_2S$ comprising a step in which $H_2S_x$ is converted to $H_2S$ in liquid sulfur in the presence of a solid catalyst comprising alumina, the improvement which comprises:

contacting the liquid sulfur and the catalyst at a temperature in the range of about 250° F. to about 320° F. with a free oxygen-containing gas and increasing the rate of the catalytic degradation of $H_2S_x$ to $H_2S$ and simultaneously purging the $H_2S$ from the liquid sulfur and increasing the rate of $H_2S$ removal therefrom by a concurrent flow wherein both the liquid sulfur and the free oxygen-containing gas flow up through a packed bed of the catalyst and wherein the rate of catalytic degradation of $H_2S_x$ to $H_2S$ and the rate of $H_2S$ removal are increased relative to corresponding rates for an inert gas in the presence of said catalyst.

* * * * *